United States Patent
Nie et al.

(10) Patent No.: US 12,183,097 B2
(45) Date of Patent: Dec. 31, 2024

(54) WEAKLY SUPERVISED MULTI-TASK LEARNING FOR CELL DETECTION AND SEGMENTATION

(71) Applicant: Ventana Medical Systems, Inc., Tucson, AZ (US)

(72) Inventors: Yao Nie, Tucson, AZ (US); Alireza Chaman Zar, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 293 days.

(21) Appl. No.: 17/718,061

(22) Filed: Apr. 11, 2022

(65) Prior Publication Data

US 2022/0237789 A1    Jul. 28, 2022

Related U.S. Application Data

(63) Continuation of application No. PCT/US2020/055550, filed on Oct. 14, 2020.

(Continued)

(51) Int. Cl.
*G06V 20/69*    (2022.01)
*G06N 7/01*    (2023.01)
(Continued)

(52) U.S. Cl.
CPC ............ *G06V 20/695* (2022.01); *G06N 7/01* (2023.01); *G06T 7/0012* (2013.01); *G06V 10/82* (2022.01);
(Continued)

(58) Field of Classification Search
CPC ........ G06V 20/695; G06V 10/82; G06N 7/01; G06T 7/0012; G06T 2207/20081; G06T 2207/20084; G06T 2207/30024

(Continued)

(56) References Cited

U.S. PATENT DOCUMENTS

| 2019/0279360 A1* | 9/2019 | Madabhushi ......... G06T 7/0012 |
| 2020/0060652 A1* | 2/2020 | Dahl ......................... G06N 3/08 |

FOREIGN PATENT DOCUMENTS

| CN | 109034365 A | 12/2018 |
| CN | 109669973 A | 4/2019 |
| JP | 2006277349 A | 10/2006 |

OTHER PUBLICATIONS

Application No. JP2022-516626, Office Action, Mailed On Mar. 15, 2023, 9 pages (pp. 1-5 English translation, pp. 6-9 original document).

(Continued)

*Primary Examiner* — Michael R Neff
(74) *Attorney, Agent, or Firm* — Kilpatrick Townsend & Stockton LLP (57) ABSTRACT

The present disclosure relates to techniques for segmenting and detecting cells within image data using transfer learning and a multi-task scheduler. Particularly, aspects of the present disclosure are directed to accessing a plurality of images of one or more cells, extracting three labels from the plurality of images, where the three labels are extracted using a Voronoi transformation, a local clustering, and application of repel code, training, by a multi-task scheduler, a convolutional neural network model based on three loss functions corresponding to the three labels, generating, by the convolutional neural network model, a nuclei probability map and a background probability map for each of the plurality of images based on the training with the three loss functions, and providing the nuclei probability map and the background probability map.

20 Claims, 5 Drawing Sheets

Related U.S. Application Data (60) Provisional application No. 62/914,966, filed on Oct. 14, 2019.

(51) Int. Cl.
*G06T 7/00* (2017.01)
*G06V 10/82* (2022.01)

(52) U.S. Cl.
CPC ............ *G06T 2207/20081* (2013.01); *G06T 2207/20084* (2013.01); *G06T 2207/30024* (2013.01)

(58) Field of Classification Search
USPC .......................................................... 382/128
See application file for complete search history.

(56) References Cited

OTHER PUBLICATIONS

Ramesh, et al., "Cell Segmentation Using a Similarity Interface with a Multi-task Convolutional Neural Network", IEEE Journal of Biomedical and Health Informatics, vol. 23, No. 4, Jul. 2019, pp. 1457-1468.
H. Liang, et al. "Enhanced Center Coding for Cell Detection with Convolutional Neural Networks." arXiv preprint arXiv: 1904.08864 (2019); all pages.
0. Ronneberger, P. Fischer, and T. Brox. "U-net: Convolutional networks for biomedical image segmentation." *International Conference on Medical image computing and computer-assisted intervention* Springer, Cham, 2015; all pages.
K. He, et al. "Deep residual learning for image recognition." *Proceedings of the IEEE conference on computer vision and pattern recognition*. 2016; all pages.
O. Russakovsky, et al. "Imagenet large scale visual recognition challenge." *International journal of computer vision* 115.3 (2015); all pages.
S. van der Walt, et al. "scikit-image: Image processing in Python", *PeerJ* 2:e453 (2014); all pages.
I. Lawrence, and K. Lin. "A concordance correlation coefficient to evaluate reproducibility." *Biometrics* (1989): pp. 255-268.
H. Qu, et al. "Weakly Supervised Deep Nuclei Segmentation using Points Annotation in Histopathology Images." *International Conference on Medical Imaging with Deep Learning* (IMDL), 2019; all pages.
A Kendall, Y. Gal, and R. Cipolla. "Multi-task learning using uncertainty to weigh losses for scene geometry and semantics." *Proceedings of the IEEE Conference on Computer Vision and Pattern Recognition*. 2018; all pages.
PCTUS2020055550 received an International Preliminary Report on Patentability mailed on Apr. 28, 2022, 9 pages.
Yu Cuiru et al.: "Breast cancer classification in pathological images based on hybrid features", Multimedia Tools and Applications, Kluwer Academic Publishers, Boston US, vol. 78, No. 15, Mar. 16, 2019 (Mar. 16, 2019), pp. 21325-21345, XP036849694, ISSN: 1380-7501, DOI: 10.1007/S11042-019-7468-9 [retrieved on Mar. 16, 2019].
JP Application No. 2022-516626, "Office Action", Mailed on Aug. 4, 2023, 6 pages.
JP Application No. 2022-516626, "Notice of Allowance", Dec. 25, 2023, 6 pages.
EP Application No. 20800520.7, "Intention to Grant", Oct. 9, 2024, 7 pages.

* cited by examiner

WEAKLY SUPERVISED MULTI-TASK LEARNING FOR CELL DETECTION AND SEGMENTATION

CROSS-REFERENCE TO RELATED APPLICATIONS

The present application is a continuation filed under 35 U.S.C. § 111(a), which claims priority and benefit from International Application PCT/US2020/055550, filed Oct. 14, 2020, which claims priority and benefit from U.S. Provisional Application No. 62/914,966, filed Oct. 14, 2019, the entire contents of which are incorporated herein by reference for all purposes.

FIELD

The present disclosure relates to biological image analysis, and in particular to systems and methods for segmenting and detecting cells using weakly supervised transfer learning and a multi-task scheduler.

BACKGROUND

In the analysis of biological specimens such as tissue sections, blood, cell cultures and the like, the biological specimens are often stained with one or more combinations of stains or assays, and then the stained biological specimen is viewed or imaged for further analysis. Observing the stained or assayed biological specimens enables a variety of processes, including diagnosis of disease, assessment of response to treatment, and development of new drugs to fight disease. For example, identification of certain objects or structures in biological images (e.g., histopathology images) such as lymphocytes, cancer cells, cancer cell nuclei, etc., is often a pre-requisite to grading or diagnosis of disease in a patient from which the biological images were obtained. The presence, extent, size, shape and other morphological appearance of these objects or structures may be important indicators for presence or severity of disease. Moreover, the number or ratio of specific objects or structures (such as cells or cell nuclei) has diagnostic significance for some disease conditions, further motivating the need to accurately identify specific objects or structures.

In the acquisition of biological images, multiple channels of image data, for example RGB color channels, may be derived, with each observed channel comprising a mixture of multiple signals. Processing of this image data can include methods of color separation, spectral unmixing, color deconvolution, etc. that are used to determine a concentration of specific stains from the observed channel or channels of image data. For image data processed by automated methods, depicted on a display, or for an assay viewed by an observer, a relation may be determined between a color of the tissue and a color of the stains, to determine a model of the biomarker distribution in the stained tissue. A local presence and amount of stain may indicate a presence and a concentration of the biomarkers queried in the tissue. Immunohistochemical (IHC) slide staining is one technique that can be utilized to identify specific proteins (e.g., biomarkers) in cells of a tissue section and is widely used in the study of different types of cells, such as cancerous cells and immune cells in biological tissue. For example, in PMS2 IHC nuclei stained colorectal cancer (CRC) images, positive tumor nuclei stained brown, positive tumor nuclei weakly stained light brown, and negative tumor nuclei stained blue in different shapes and sizes (e.g., elongated and highly clustered) may be identified and/or quantified to distinguish patients with Lynch syndrome (LS) from patients with deficient DNA mismatch repair (dMMR).

SUMMARY

In various embodiments, a computer-implemented method is provided that comprises: accessing, by a data processing system, a plurality of images of one or more cells, extracting, by the data processing system, three labels from the plurality of images, wherein the three labels are extracted using a Voronoi transformation, a local clustering, and application of repel code, training, by a multi-task scheduler of the data processing system, a convolutional neural network model based on three loss functions corresponding to the three labels, generating, by the convolutional neural network model, a nuclei probability map and a background probability map for each of the plurality of images based on the training with the three loss functions, and providing, by the data processing system, the nuclei probability map and the background probability map.

In various embodiments, a computer-implemented method is provided that comprises: accessing, by a data processing system, a plurality of images of one or more cells; extracting, by the data processing system, three labels from the plurality of images, wherein the three labels are extracted using a Voronoi transformation, a local clustering, and application of repel code; training, by a multi-task scheduler of the data processing system, a convolutional neural network model based on three loss functions corresponding to the three labels, wherein the convolutional network model comprises a plurality of model parameters; generating, by the convolutional neural network model, a nuclei probability map and a background probability map for each of the plurality of images based on the training with the three loss functions; comparing, by the data processing system, the nuclei probability map and the background probability map to the three labels; updating, by the data processing system, the plurality of model parameters based on the comparing the nuclei probability map and the background probability map to the three labels to minimize the three loss functions; and providing, by the data processing system, a trained convolutional neural network model with the updated plurality of model parameters.

In some embodiments, the plurality of images comprise nuclei point labels.

In some embodiments, the Voronoi transformation extracts ridge lines between the one or more cells.

In some embodiments, the local clustering includes applying a k-mean clustering algorithm to locally extract background and nuclei clusters based on RGB channels color features which are concatenated with a distance transform feature, which is a distance of each pixel in each cell or polygon created by the Voronoi transformation to the nuclei point label.

In some embodiments, the convolutional neural network model comprises a modified U-Net model.

In some embodiments, the training comprises: for each training iteration, select, by the multi-task scheduler, one of the three loss functions; and update, by the data processing system, one or more weights of the convolutional neural network model based on a gradient of the selected loss function.

In some embodiments, the loss function is selected by the multi-task scheduler based on the following: select the loss function associated with the Voronoi label if "i % 3=0", the loss function associated with the repel label if "i % 3=1", and the loss function associated with the local cluster label if "i % 3=2", where "i" is the index of the training iteration.

In some embodiments, the generating and the providing the nuclei probability map and the background probability map comprise applying argmax and local maxima functions on the nuclei probability map and the background probability map, segmentation binary masks and coordinates of detected cells.

In various embodiments, a computer-implemented method is provided that comprises: obtaining, by a data processing system, a plurality of images of one or more cells; inputting the plurality of images into a convolutional neural network model constructed using a combination of at least three loss functions corresponding to a Voronoi transformation, a local clustering, and application of repel code; generating, by the convolutional neural network model, a nuclei probability map and a background probability map for each of the plurality of images; and providing, by the data processing system, the nuclei probability map and the background probability map.

In some embodiments, the Voronoi transformation extracts ridge lines between the one or more cells.

In some embodiments, the local clustering includes applying a k-mean clustering algorithm to locally extract background and nuclei clusters based on RGB channels color features which are concatenated with a distance transform feature, which is a distance of each pixel in each cell or polygon created by the Voronoi transformation to the nuclei point label.

In some embodiments, the convolutional neural network model comprises a modified U-Net model.

In some embodiments, the convolutional neural network model comprises a plurality of parameters identified using a set of training data comprising a plurality of medical images with at least three labels extracted using the Voronoi transformation, the local clustering, and the application of repel code; and the plurality of model parameters are identified using the set of training data based on minimizing the at least three loss functions.

In some embodiments, using the set of training comprises: for each training iteration, select, by a multi-task scheduler, one of the three loss functions; and update, by the data processing system, one or more of the plurality of parameters of the convolutional neural network model based on a gradient of the selected loss function.

In some embodiments, the loss function is selected by the multi-task scheduler based on the following: select the loss function associated with the Voronoi label if "i % 3=0", the loss function associated with the repel label if "i % 3=1", and the loss function associated with the local cluster label if "i % 3=2", where "i" is the index of the training iteration.

In some embodiments, the generating and the providing the nuclei probability map and the background probability map comprise applying argmax and local maxima functions on the nuclei probability map and the background probability map, segmentation binary masks and coordinates of detected cells.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims

BRIEF DESCRIPTION OF THE DRAWINGS

The present disclosure is described in conjunction with the appended figures.

DETAILED DESCRIPTION

I. Overview

The present disclosure describes techniques for automated cell segmentation and detection. More specifically, various embodiments of the present disclosure provide systems and methods for segmenting and detecting cells using transfer learning and a multi-task scheduler.

Single cell segmentation and detection is a fundamental step towards analysis of pathology in biological images. A cell's population and density, morphological information, and stain quality metrics are examples of information which can be obtained from the segmented and detected cells in a biological sample (e.g., tissue slide) for diagnosis purpose and/or stain quality measurement. Recent studies in cell segmentation based on deep learning methods have reported better performance compared to the traditional image processing methods such as color separation, spectral unmixing, and color deconvolution. Comparing to tasks such as classification and segmentation of easy-to-label objects (e.g., cars, trees, animals, etc.), cell detection and instance segmentation face additional challenges. For example, stained cells have large variation of contrast to the background; highly clustered cells have touching or overlapped boundaries and hard to segment individually; and most importantly, obtaining the pixel-level ground truth for cell instance segmentation is extremely labor intensive.

To address these limitations and problems, the techniques for automated single cell segmentation and detection of the present embodiments include the use of a weakly supervised multi-task learning algorithm for automated and end-to-end single cell segmentation and detection. One illustrative embodiment of the present disclosure is directed to a method comprising: accessing a plurality of images of one or more cells, extracting three labels from the plurality of images, where the three labels are extracted using a Voronoi transformation, a local clustering, and application of repel code, training, by a multi-task scheduler, a convolutional neural network model based on three loss functions corresponding to the three labels, generating, by the convolutional neural network model, a nuclei probability map and a background probability map for each of the plurality of images based on the training with the three loss functions, and providing the nuclei probability map and the background probability map. In certain embodiments, the generating and providing the nuclei probability map and the background probability map comprise applying argmax and local maxima functions on the nuclei probability map and the background probability map, segmentation binary masks and coordinates of detected cells.

II. Definitions

As used herein, when an action is "based on" something, this means the action is based at least in part on at least a part of the something.

As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

III. Techniques for Automated Cell Segmentation and Detection

Image segmentation is a procedure to separate similar portions of images showing resemblance in different features like shape, size, color, etc. Segmentation of cells allows visualization of the size and position of a cell within a biological sample, and may also provide a basis for analysis of stain uptake by the cell. The gold standard of cell segmentation has long been manual segmentation, which is time-consuming and labor-intensive, and thus unsuitable for large studies. Considerable research has been done to attempt to fully or partially automate the process of cell segmentation. For example, image segmentation techniques such as thresholding, region growing, fuzzy clustering, use of the watershed algorithm, etc., have been used for separating abnormal cells (e.g., cancerous cells) from normal cells (e.g., lymphocytes). Nonetheless, the process of segmentation is still challenging due to the diversity of shape, location, and size of the cells.

Multi-task scheduling techniques that combine information from pixel-level labels obtained using Voronoi transformation, color cluster labeling, and repel code can help improve accurate cell segmentation and detection.

Described herein is an end-to-end method incorporating a model that uses a convolutional neural network (CNNs) to segment and detected cells from images (e.g., images of stained tissue). The developed model is computationally light and devised to accommodate variability in staining techniques, extreme imbalance between cancerous cells and normal cells and the heterogeneous nature of the input images. The model has improved performance for cell segmentation and detection over conventional algorithms without increasing the annotation efforts.

III.A. Example Computing Environment

Figure 1:
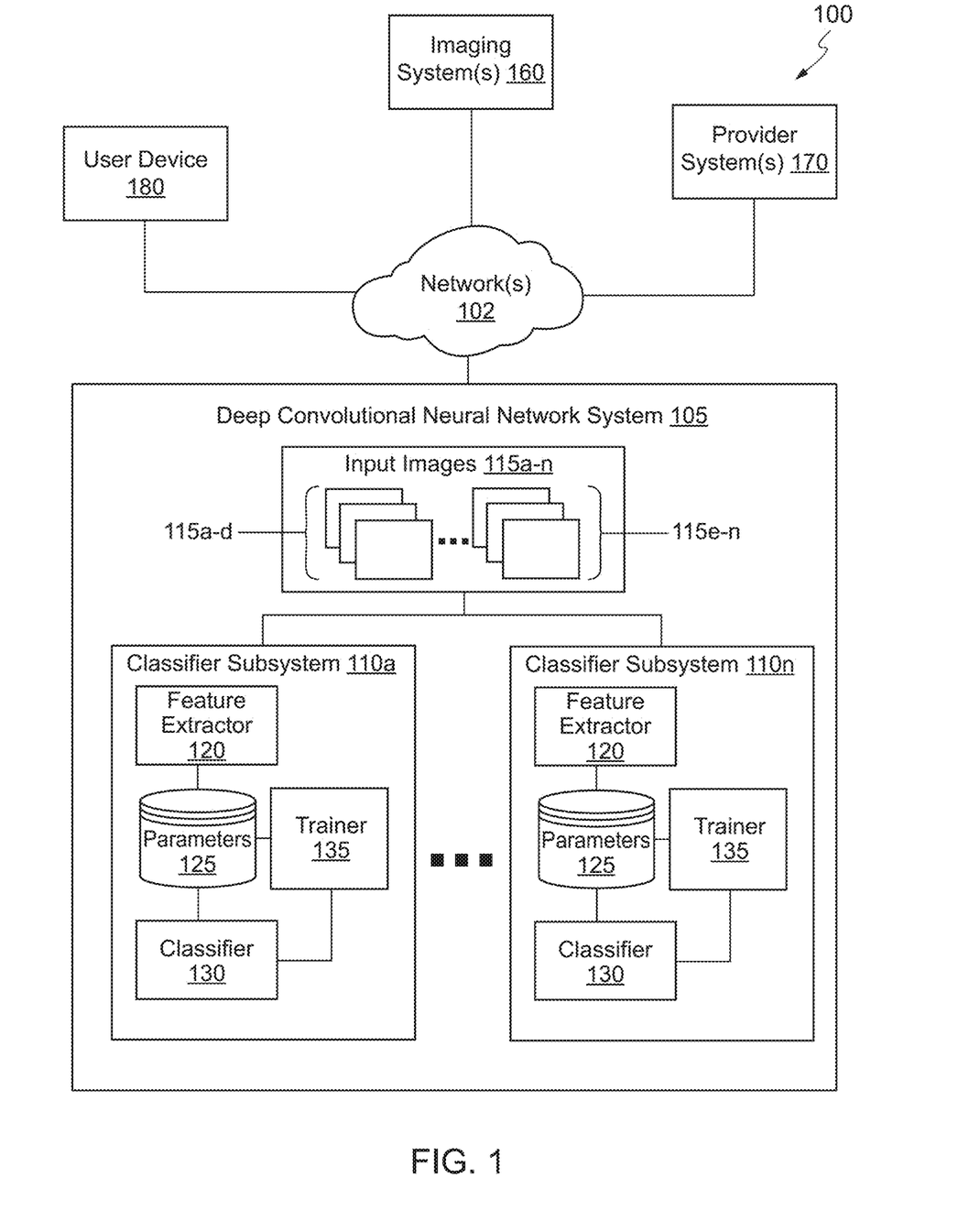
FIG. 1 shows an example computing environment for automated cell segmentation and detection according to various embodiments.

FIG. 1 illustrates an example computing environment 100 for cell segmentation and detection using deep convolutional neural networks according to various embodiments. The computing environment 100 can include a deep convolutional neural network (CNN) system 105 to train and execute CNN models. More specifically, the CNN system 105 can include classifier subsystems 110a-n that can train their respective CNN models. In some embodiments, each CNN model corresponding to the classifier subsystems 110a-n is separately trained based on one or more images (e.g., images from a field of view (FOV) on a slide of a biological sample) within a set of input image elements 115a-n. In some embodiments, each of the set of input image elements 115a-n may include one or more digital images depicting cells within a biological sample. Each of the set of input image elements 115a-n can correspond to a single subject and a single day on which underlying image data corresponding to the image was collected. The set of input image elements 115a-n can include one or more training input image elements 115a-d, validation input image elements 115e-g, and unlabeled input image elements 115h-n. It will be appreciated that input image elements corresponding to the training, validation and unlabeled groups need not be accessed at a same time. For example, an initial training and validation input image elements may first be accessed and used to train a model, and unlabeled input image elements may be subsequently accessed or received (e.g., at a single or multiple subsequent times) for testing of the model.

In some instances, the CNN models can be trained using weakly supervised training, and each of the training input image elements 115a-d and the validation input image elements 115e-g can be associated with one or more cell point labels that identify a "correct" interpretation of a cell (e.g., a center of a nuclei of a cell). The CNN models can be trained using the training input image elements 115a-d (and the validation input image elements 115e-h to monitor training progress), one or more loss functions and/or a gradient descent method.

In some embodiments, the classifier subsystems 110a-n includes a feature extractor 120, a parameter data store 125, a classifier 130, and a trainer 135, which are collectively used to train the CNN models based on training data (e.g., the training input image elements 115a-d) and optimizing the parameters of the CNN models during weakly supervised training. In some embodiments, the classifier subsystem 110a-n accesses training data from the training input image elements 115a-d at the input layers. The feature extractor 120 may pre-process the training data to extract relevant features (e.g., edges) of the training input image elements 115a-d. In various embodiments, the feature extractor 120 is implemented using a multi-task scheduler to apply at least three transformations and/or encodings on the cell point labels to extract features or labels of the cells. The at least three transformations and/or encodings may include a Voronoi transformation for extracting ridge lines, a local clustering to extract pixel-level labels of nuclei, and application of a repel code as enhanced center coding. The classifier 130 can receive the extracted features and transform the features, in accordance with weights associated with a set of hidden layers in one or more CNN models, into one or more output metrics that segment and detect one or more cells. The trainer 135 may use training data corresponding to the training input image elements 115a-d to train the feature extractor 120 and/or the classifier 130 by facilitating learning one or more parameters. For example, the trainer 135 can use a backpropagation technique to facilitate learning of weights associated with a set of hidden layers of the CNN model used by the classifier 130. The backpropagation may use, for example, a stochastic gradient descend (SGD) algorithm to cumulatively update the parameters of the hidden layers using one or more of the losses from the Voronoi, repel, and color cluster features. Learned parameters may include, for instance, weights, biases, and/or other hidden layer-related parameters, which can be stored in the parameter data store 125.

A trained CNN model or an ensemble of trained CNN models ("CNN ensemble") can be deployed to process unlabeled input image elements 115h-n to segment and detect one or more cells. More specifically, a trained version of the feature extractor 120 may generate a feature representation of an unlabeled input image element, which can then be processed by a trained version of the classifier 130. In some embodiments, image features can be extracted from the unlabeled input image elements 115h-n based on one or more convolutional blocks, convolutional layers, residual blocks, or pyramidal layers that leverage dilation of the CNN models in the classifier subsystems 110a-n. The features can be organized in a feature representation, such as a feature vector of the image. The CNN models can be trained to learn the feature types based on classification and subsequent adjustment of parameters in the hidden layers, including a fully connected layer of the CNN models. In some embodiments, the image features extracted by the convolutional blocks, convolutional layers, residual blocks, or pyramidal layers include feature maps that are matrix of values that represent one or more portions of the images at which one or more image processing operations have been performed (e.g., edge detection, sharpen image resolution). These feature maps may be flattened for processing by a fully connected layer of the CNN models, which outputs a segmentation mask corresponding to a prediction pertaining to one or more cells.

For example, an input image element can be fed to an input layer of a CNN model. The input layer can include nodes that correspond with specific pixels. A first hidden layer can include a set of hidden nodes, each of which is connected to multiple input-layer nodes. Nodes in subsequent hidden layers can similarly be configured to receive information corresponding to multiple pixels or voxels. Thus, hidden layers can be configured to learn to detect features extending across multiple pixels. Each of one or more hidden layers can include a convolutional block, convolutional layer, residual block, or pyramidal layer. The CNN model can further include one or more fully connected layers (e.g., a softmax layer).

At least part of the training input image elements 115a-d, the validation input image elements 115e-g and/or the unlabeled input image elements 115h-n may include or may have been derived from data collected using and received from one or more imaging systems 160. The imaging system 160 can include a system configured to collect image data (e.g., FOV images of a slide). The imaging system 160 may include a microscope. The microscope may be configured to take images of a tissues and/or slide stained on a medium such as a glass slide. In some instances, cell point labels associated with the training input image elements 115a-d and/or validation input image elements 115e-g may have been received or may be derived from data received from one or more provider systems 170, each of which may be associated with (for example) a physician, nurse, hospital, pharmacist, etc. associated with a particular subject. The received data may include (for example) one or more medical records corresponding to the particular subject. The medical records may indicate (for example) a professional's diagnosis or characterization that indicates, with respect to a time period corresponding to a time at which one or more input image elements associated with the subject were collected or a subsequent defined time period, whether the subject had a tumor and/or a stage of progression of the subject's tumor. The received data may further include the pixel(s) of the locations of the center of cells or cell nuclei within the one or more input image elements associated with the subject. Thus, the medical records may include or may be used to identify, with respect to each training/validation input image element, one or more cell point labels. The medical records may further indicate each of one or more treatments (e.g., medications) that the subject had been taking and time periods during which the subject was receiving the treatment(s). In some instances, images that are input to one or more classifier subsystems are received from the provider system 170. For example, the provider system 170 may receive images from the imaging system 160 and may then transmit the images (e.g., along with a subject identifier and one or more labels) to the CNN system 105.

In some embodiments, data received at or collected at one or more of the imaging systems 160 may be aggregated with data received at or collected at one or more of the provider systems 170. For example, the CNN system 105 may identify corresponding or identical identifiers of a subject and/or time period so as to associate image data received from the imaging system 160 with cell point label data received from the provider system 170. The CNN system 105 may further use metadata or automated image analysis to process data to determine to which classifier subsystem particular data components are to be fed. For example, image data received from the imaging system 160 may correspond to multiple slides and/or assays. Metadata, automated alignments and/or image processing may indicate, for each image, to which slide and/or assay the image corresponds.

In some embodiments, the computing environment 100 can further include a user device 180, which can be associated with a user that is requesting and/or coordinating performance of one or more iterations (e.g., with each iteration corresponding to one run of the model and/or one production of the model's output(s)) of the CNN system 105. The user may correspond to a physician, investigator (e.g., associated with a clinical trial), subject, medical professional, etc. Thus, it will be appreciated that, in some instances, the provider system 170 may include and/or serve as the user device 180. Each iteration may be associated with a particular subject (e.g., person), who may (but need not) be different than the user. A request for the iteration may include and/or be accompanied with information about the particular subject (e.g., a name or other identifier of the subject, such as a de-identified patient identifier). A request for the iteration may include an identifier of one or more other systems from which to collect data, such as input image data that corresponds to the subject. In some instances, a communication from the user device 180 includes an identifier of each of a set of particular subjects, in correspondence with a request to perform an iteration for each subject represented in the set.

Upon receiving the request, the CNN system 105 can send a request (e.g., that includes an identifier of the subject) for unlabeled input image elements to the one or more corresponding imaging systems 160 and/or provider systems 170. The trained CNN model or CNN ensemble can then process the unlabeled input image elements to segment and detect one or more cells. A result for each identified subject may include or may be based on the cell segmenting and detecting from one or more trained CNN models deployed by the classifier subsystems 110a-n. For example, the cell segmentation and detection can include or may be based on output generated by the fully connected layer of one or more trained CNNs. In some instances, such outputs may be further processed using (for example) a softmax function. Further, the outputs and/or further processed outputs may then be aggregated using an aggregation technique (e.g., random forest aggregation) to generate one or more subject-specific metrics. One or more results (e.g., that include assay-specific outputs and/or one or more subject-specific outputs and/or processed versions thereof) may be transmitted to and/or availed to the user device 180. In some instances, some or all of the communications between the CNN system 105 and the user device 180 occurs via a network and interface such as a website. It will be appreciated that the CNN system 105 may gate access to results, data and/or processing resources based on an authorization analysis.

While not explicitly shown, it will be appreciated that the computing environment 100 may further include a developer device associated with a developer. Communications from a developer device may indicate what types of input image elements are to be used for each CNN model in the CNN system 105, a number of neural networks to be used, configurations of each neural network including number of hidden layers and hyperparameters, and how data requests are to be formatted and/or which training data is to be used (e.g., and how to gain access to the training data).

III.B. Multi-Task Scheduler

Figure 2:
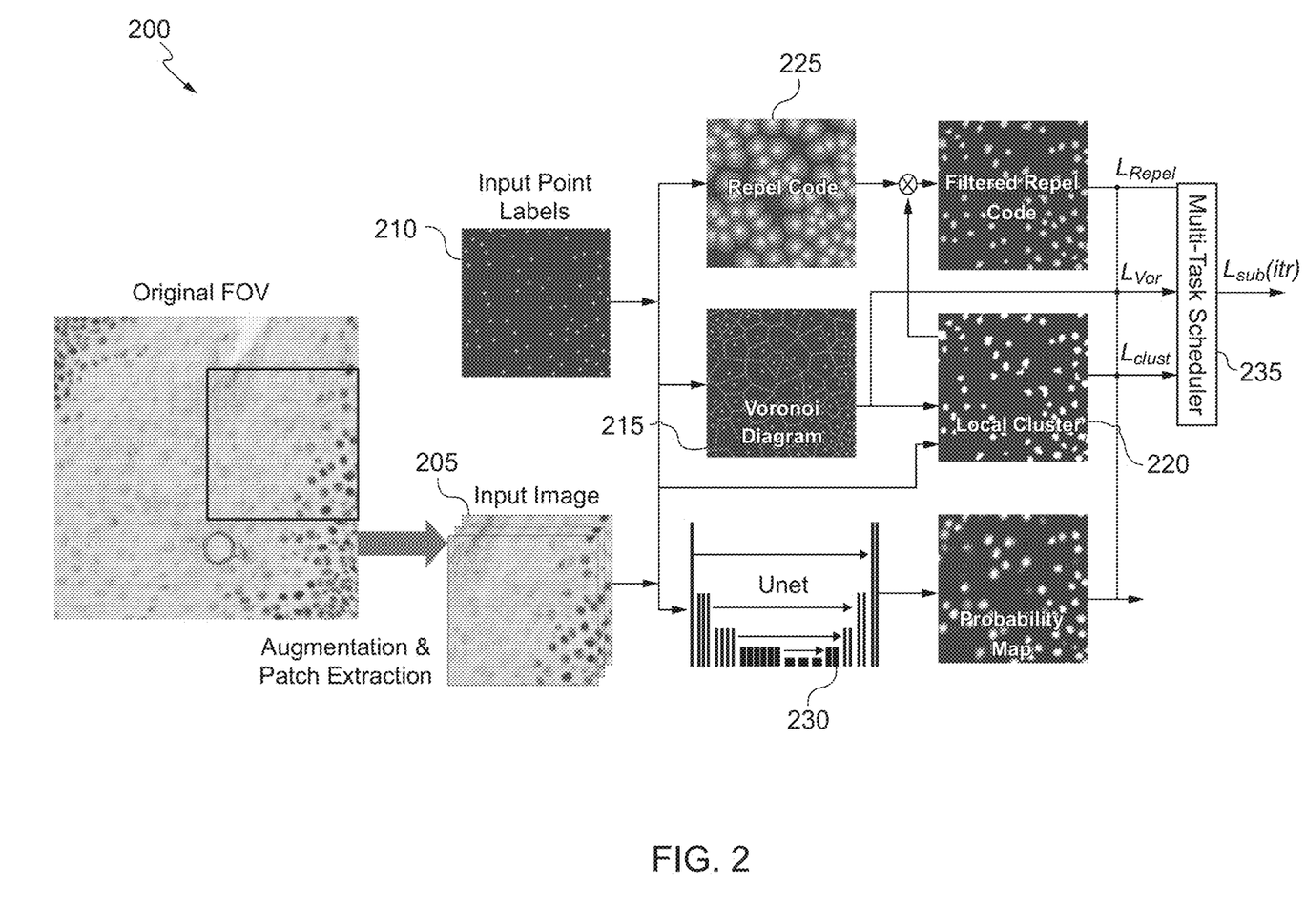
FIG. 2 shows an overview of a proposed algorithm in accordance with various embodiments.

FIG. 2 illustrates the overview of a predictive algorithm including: pixel-level label extraction based on cell point labels and a multi-task deep learning method using a loss scheduler and based on a U-Net model with a ResNet encoder. In some embodiments, input images 205 are obtained from an image source (e.g., the imaging systems 160 or provider systems 170, as described with respect to FIG. 1). The images may be structured as one or more arrays or matrices of pixel values. A given pixel position may be associated with (for example) a general intensity value and/or an intensity value as it pertains to each of one or more gray levels and/or colors (e.g., RGB values). The input images 205 may be labeled with cell point labels 210 that identify the one or more pixels at the center of the cell or the center of a nuclei of a cell.

In various embodiments, three transformations/encodings are applied on the cell point labels 210: (i) Voronoi transformation 215, (ii) local clustering 220, and (iii) repel code 225. The Voronoi transformation 215 extracts ridge lines between cells and forms a polygon around each cell. These lines help the highly-clustered cells not to be merged together. The local clustering 220 extracts the pixel-level labels of nuclei based on the point labels, input images 205, and the Voronoi labels. For each Voronoi cells (polygons) extracted, a k-mean clustering algorithm is used to locally extract the background and nuclei clusters based on RGB channels color features which are concatenated with the distance transform feature, which is the distance of each pixel in the Voronoi cell to the nuclei point label. Using this local k-means, the nuclei pixels are extracted, which are located around the point labels and have high local color contrast with the background. Repel code 225 is used as an enhanced center coding for cells (Repel is code is described in detail in H. Liang, et al. "Enhanced Center Coding for Cell Detection with Convolutional Neural Networks." arXiv preprint arXiv:1904.08864 (2019), which is incorporated herein for all purposes). The extracted repel code 225 may be multiplied by a color cluster mask to make the background pixels to have zero value.

The three extracted labels, i.e., filtered repel, local color cluster, and Voronoi labels (see FIG. 2) are then compared against nuclei and background probability maps, which are two output channels of the U-Net model 230. This comparison is done through three losses $L_{Repel}$, $L_{Vor}$, and $L_{Clust}$ in the training process. In some instances, a cross entropy loss function was used for the binary labels (Voronoi and color cluster) and a mean squared error (MSE) loss function was used for the repel code label, as defined in Equations (1-3) described in detail herein with respect to Example 1. Since there are three different losses, based on which the model 230 is being trained, the losses need to be combined and the weights of the model updated in each training iteration. The multi-task scheduler 235 is used to combine the losses and update the weights of the model 230. In some instances, in each training iteration one of the three losses ($L_{Repel}$, $L_{Vor}$, and $L_{Clust}$) is chosen and the weights of the model are updated based on the gradient of that specific loss. If it is assumed that "i" is the index of the training iteration, the scheduler 235 chooses the Voronoi loss if "i % 3=0", the repel loss if "i % 3=1", and the color cluster loss if "i % 3=2", as defined in Equation (4) described in detail herein with respect to Example 1.

III.C. Exemplary U-Net for Segmentation and Detection

Figure 3:
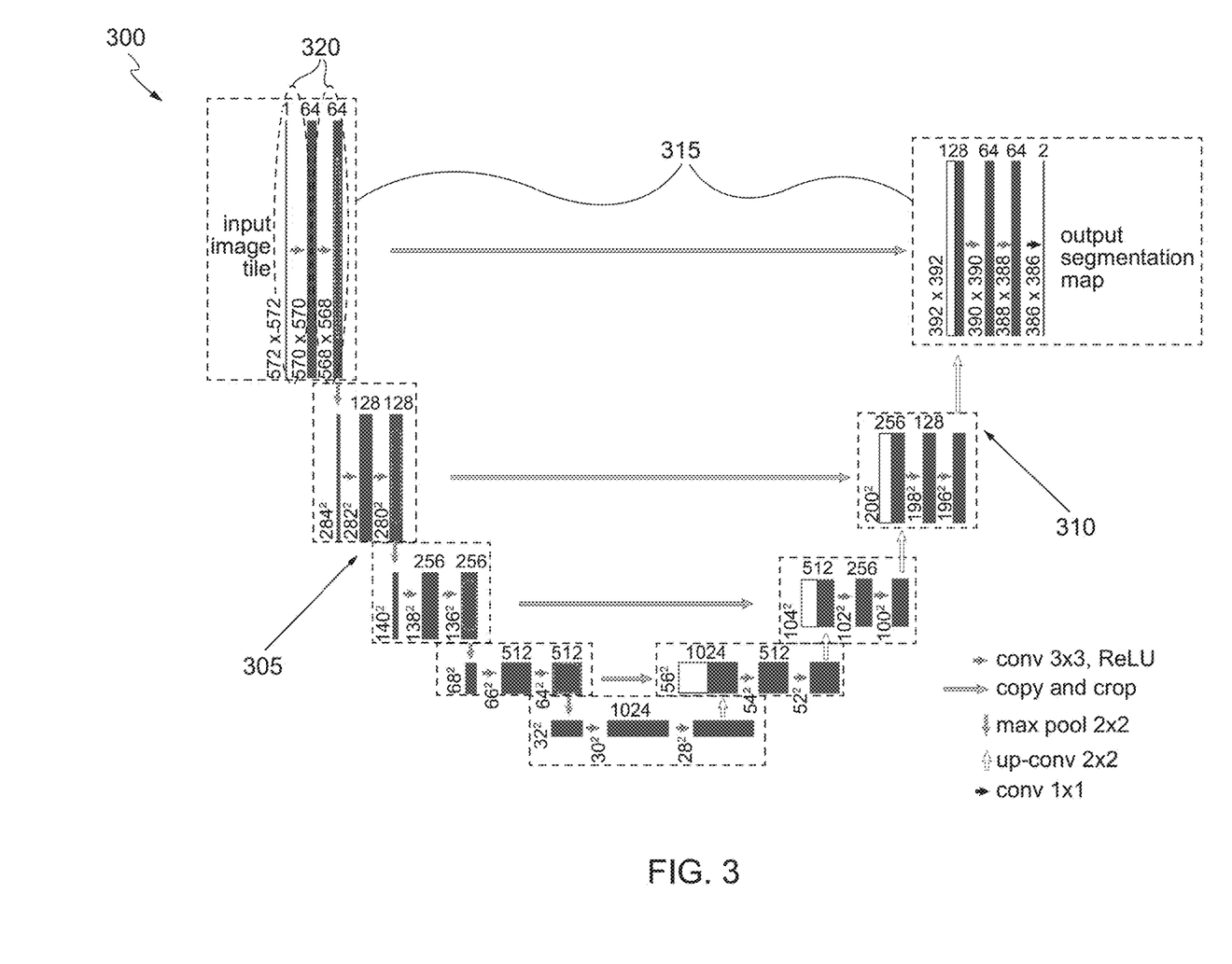
FIG. 3 shows an exemplary U-Net in accordance with various embodiments.

The segmentation extracts features from the input images individually using a modified U-Net where the encoder part is replaced with the convolutional layers of ResNet50, which is pre-trained on the ImageNet dataset to generate nuclei and background probability maps. As shown in FIG. 3, a U-Net 300 may include a contracting path 305 and an expansive path 310, which gives it a u-shaped architecture. The contracting path 305 is a CNN network that includes repeated application of convolutions (e.g., 3×3 convolutions (unpadded convolutions)), each followed by a rectified linear unit (ReLU) and a max pooling operation (e.g., a 2×2 max pooling with stride 2) for downsampling. At each downsampling step or pooling operation, the number of feature channels may be doubled. During the contraction, the spatial information of the image data is reduced while feature information is increased. The expansive path 310 is a CNN network that combines the feature and spatial information from the contracting path 305 (upsampling of the feature map from the contracting path 305). The upsampling of the feature map is followed by a sequence of up-convolutions (upsampling operators) that halves the number of channels, concatenations with a correspondingly cropped feature map from the contracting path 305, repeated application of convolutions (e.g., two 3×3 convolutions) that are each followed by a rectified linear unit (ReLU), and a final convolution (e.g., one 1×1 convolution) to generate the nuclei and background probability maps. In order to localize, the high-resolution features from the contracting path 305 are combined with the upsampled output from the expansive path 310. The U-Net 300 uses the valid part of each convolution without any fully connected layers, i.e., the nuclei and background probability maps only contain the pixels, for which the full context is available in the input image, and uses skip connections that link the context features learned during a contracting block and the localization features learned in an expansion block.

IV. EXAMPLES

The systems and methods implemented in various embodiments may be better understood by referring to the following example(s).

IV.A. Example 1.—Weakly Supervised Multi-Task Learning for Cell Detection and Segmentation Cell detection and segmentation is fundamental for all downstream analysis of digital pathology images. However, obtaining the pixel-level ground truth for single cell segmentation is extremely labor intensive. To overcome this challenge, an automated and end-to-end deep learning single cell detection, and segmentation algorithm was developed as follows by extracting Voronoi, repel, and local color cluster labels based on available point labels from image data, and training a U-Net model using: the Voronoi, repel, and local color cluster labels and transfer learning (ResNet pre-trained on ImageNet). Compared to conventional cell segmentation and detection techniques, the designed algorithm shows significant improvement in cell detection and segmentation without increasing annotation efforts.

IV.B. Dataset

The designed algorithm was trained, validated, and tested on immunohistochemistry (IHC) PMS2 stained colorectal cancer and tonsil tissue slides. The dataset includes 256 512×512 images at the resolution of 0.5 µm/pixel, covering tumor, peri-tumor, normal tissue, intra- and inter-follicular regions in the slides. This dataset had a rich variety of nuclei for the detection and segmentation tasks, e.g., positive cells (dark or weak brownish stains) and negative cells (bluish stains) in different shapes and sizes, with sparse or highly clustered spatial distribution.

IV.C. Preprocessing and Augmentation

The dataset was split into train (80%), validation (10%), and test (10%), making sure that each set has all types of tissue regions (e.g., tumor, peri-tumor, normal tissue, etc.). Small patches of 250×250 pixels were extracted from the original images. To increase the size of the training set, data augmentation was performed, including horizontal and vertical flip, random resize, affine transform, rotation and crop. This resulted in a training set of ~3000 small images. As the last preprocessing step, the training set was normalized by mean subtraction and division by the standard deviation of the RGB channels separately. Same normalization was applied on the images in the validation and testing set.

IV.D. Label Extraction

Figure 4:
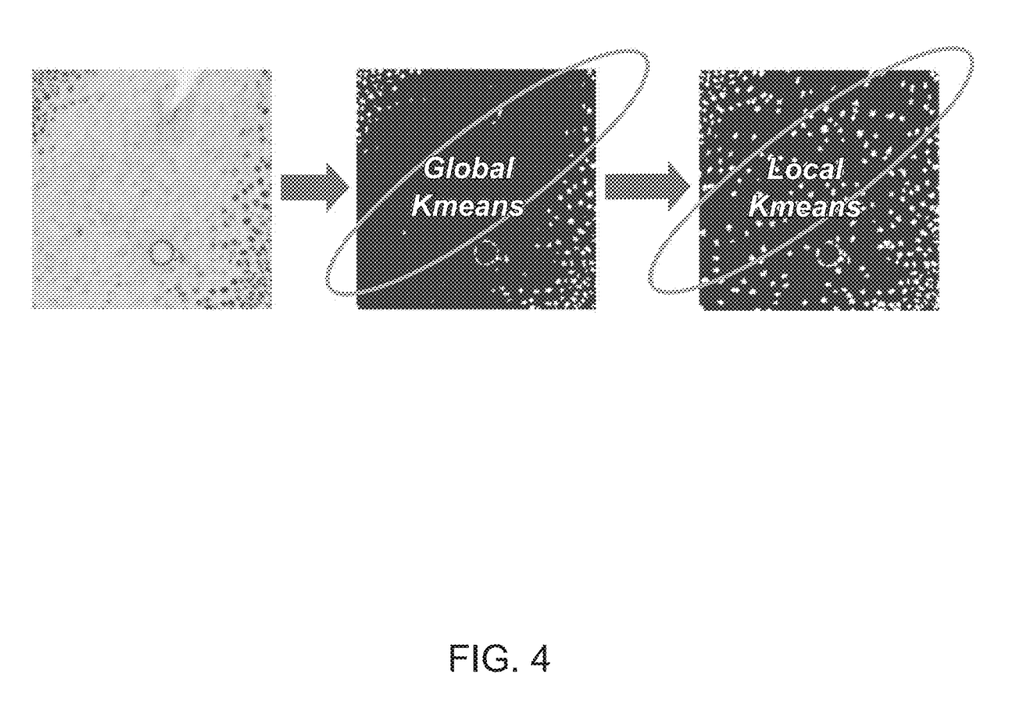
FIG. 4 shows performance of the proposed local clustering algorithm versus global clustering algorithm in accordance with various embodiments.

To overcome the challenges of instance cell segmentation and detection, the designed algorithm was designed in a weakly supervised fashion. For example, three transformations/encodings were applied on cell point labels (e.g., point labels at the center of the nuclei of each cell within the FOVs): (i) Voronoi transformation, (ii) local clustering, and (iii) repel code. FIG. 2 shows an overview of the designed algorithm including: pixel-level label extraction based on cell point labels and a multi-task deep learning method using a loss scheduler and based on a U-Net model with a ResNet encoder. The Voronoi transformation extracts ridge lines between cells and forms a polygon around each cell. These lines help the highly-clustered cells not to be merged together. The local clustering extracts the pixel-level labels of nuclei based on the point labels, original images, and the Voronoi labels. For each Voronoi cells (polygons) extracted, a k-mean clustering algorithm is used to locally extract the background and nuclei clusters based on RGB channels color features which are concatenated with the distance transform feature, which is the distance of each pixel in the Voronoi cell to the nuclei point label. Using this local k-means, the nuclei pixels are extracted, which are located around the point labels and have high local color contrast with the background. In comparison to conventional global color clustering techniques, the local clustering approach improves the quality of color cluster labels significantly for the weakly stained nuclei. FIG. 4 illustrates performance of the local clustering algorithm as compared to a global clustering algorithm used in a conventional segmentation algorithm. As shown, the weakly stained cells were well retained through the local clustering approach while the global clustering approach misses to detect most of the weakly stained cells.

Repel encoding is an enhanced center encoding for cells (see, e.g., H. Liang, et al. "Enhanced Center Coding for Cell Detection with Convolutional Neural Networks." arXiv preprint arXiv:1904.08864 (2019), which is incorporated herein for all purposes) that defines a two-dimensional decaying function with a peak located at the cell center point label. Compared to the commonly used Gaussian and proximity encoding, the repel code decays faster for cells which have shorter distance to the neighboring cells. Therefore, the repel code is exploited in the deigned algorithm to promote better cell separation in the segmentation task and at the same time better center localization for the detection task. In addition, to promoting better nuclei boundary delineation, the extracted repel code is multiplied by the local pixel clustering label mask to ensure the background pixels have a zero value in the repel code map, which is referred to as a "filtered repel" in FIG. 2.

IV.E. Model

A U-Net model was used, where the encoder part was replaced with the convolutional layers of the ResNet50, which was pre-trained on the ImageNet dataset. See, for example, O. Ronneberger, P. Fischer, and T. Brox. "U-net: Convolutional networks for biomedical image segmentation." *International Conference on Medical image computing and computer-assisted intervention*. Springer, Cham, 2015; K. He, et al. "Deep residual learning for image recognition." *Proceedings of the IEEE conference on computer vision and pattern recognition*. 2016; and O. Russakovsky, et al. "Imagenet large scale visual recognition challenge." *International journal of computer vision* 115.3 (2015): 211-252, which are incorporated herein for all purposes.

IV.E. Multi-Task Scheduler

The three extracted labels, i.e., filtered repel, local color cluster, and Voronoi labels (see FIG. 2) were compared against nuclei and background probability maps, which are two output channels of the U-Net model. This comparison was done through three losses in the training process: cross entropy loss function was used for the binary labels (Voronoi and color cluster) and mean squared error (MSE) loss function was used for the repel code label, as defined in Equations (1-3):

$$L_{clust}(t, o) = \qquad (1)$$
$$-\frac{1}{n*m}\sum_{i=1}^{n}\sum_{j=1}^{m}[t(i, j)\cdot\log o(i, j) + (1 + -t(i, j))\cdot\log(1 - o(i, j))],$$

$$L_{vor}(t, o) = -\frac{1}{n*m - |ignored|} \qquad (2)$$
$$\sum_{\substack{i=1\\i\neq ignored}}^{n}\sum_{\substack{j=1\\j\neq ignored}}^{m}[t(i, j)\cdot\log o(i, j) + (1 - t(i, j))\cdot\log(1 - o(i, j))],$$

$$L_{repel}(t, o) = \frac{1}{n*m}\sum_{i=1}^{n}\sum_{j=1}^{m}(t(i, j) - o(i, j))^2, \qquad (3)$$

where o is the model output probability map, and t is the corresponding target, i.e., Voronoi, repel or local pixel cluster labels. The pixels in the ignored set in (2) are ignored in the Voronoi loss function (as illustrated by the black pixels inside the Voronoi sub-regions in FIG. 1), such that only the pixels indicated by the red lines (used as background) and green dots (used as foreground) are included.

Since three different losses are used to train a single model, a strategy is needed to combine them for updating the weights of the model in each training iteration. For a multi-task learning problem, naïve summation may not be the optimal solution, as the nature of the tasks can be very different. To address this issue, a multi-task scheduler is proposed. Specifically, in each training iteration, only one of the three losses is used to update the model weights using the following rule: assume "i" is the index of the training iteration, the scheduler chooses the Voronoi loss if "i % 3=0", the repel loss if "i % 3=1", and the color cluster loss if "i % 3=2", as follows in Equation (4):

$$L_{Sub}^{i}(t,o) = \mathbb{1}_{\{i|i\ \%\ 3=0\}}(i)\cdot L_{vor}^{i}(t,o) + \mathbb{1}_{\{i|i\ \%\ 3=1\}}(i)\cdot L_{repel}^{i}(t,o) + \mathbb{1}_{\{i|i\ \%\ 3=2\}}(i)\cdot L_{clust}^{i}(t,o), \qquad (4)$$

Where $L_{Sub}^{i}(t, o)$ is the selected loss at the $i^{th}$ training iteration, and $\mathbb{1}_A(i)$ is an indicator function which takes value 1 if i∈A, and 0 otherwise. Since the dataset was randomly shuffled before the small batches were extracted for each epoch, each data point has the chance to contribute to all three types of losses/tasks. This multi-task scheduler shows a better performance for each individual task, as it is discussed in the next section, in comparison with the conventional naïve summation of losses. Binary segmentation masks are generated using an argmax function applied on the output probability maps, which sets the pixel values to one where the probability value of nuclei is higher than background and zero otherwise. In addition, the cells are detected by finding the location of local maxima, with minimum distance of 2.5 μm, in the nuclei output probability map using a maximum filter (see, e.g., S. van der Walt, et al. "scikit-image: Image processing in Python", *PeerJ* 2:e453 (2014), which is incorporated herein for all purposes).

IV.F. Segmentation and Detection Results

To perform segmentation and detection, the model was trained in PyTorch (see, e.g., A. Paszke, et al., "Automatic Differentiation in PyTorch", *NIPS Autodiff Workshop*, 2017, which is incorporated herein for all purposes) using a small batch size of 8, 150 epochs, and 60900 total training iterations. A ranger optimizer as described in L. Wright, "New Deep Learning Optimizer, Ranger: Synergistic combination of RAdam+LookAhead for the best of both." (2019), which is incorporated herein for all purposes, was used for updating the parameters and improved the performance of training. A learning rate of 0.001 was used. For the repel code, based on Equation (4) in H. Liang, et al. "Enhanced Center Coding for Cell Detection with Convolutional Neural Networks." arXiv preprint arXiv: 1904.08864 (2019), α=0.05, and r=70 were used.

The designed algorithm had a pixel-level accuracy of 92.9%, pixel-level F1 score of 79.1%, object-level Dice score of 0.784, object-level Aggregated Jacard Index (AJI) score of 0.599, detection precision of 94.1%, detection recall of 92.5%, and detection concordance correlation coefficient (CCC, α=0.05, as defined in I. Lawrence, and K. Lin. "A concordance correlation coefficient to evaluate reproducibility." *Biometrics* (1989): 255-268, which is incorporated herein for all purposes) of 0.998. The segmentation performance metrics were used as defined in H. Qu, et al. "Weakly Supervised Deep Nuclei Segmentation using Points Annotation in Histopathology Images." *International Conference on Medical Imaging with Deep Learning (IMDL)*, 2019 [1], which is incorporated herein for all purposes. The detection precision and recall metrics are defined as TP/(TP+FP) and TP/(TP+FN), respectively, where TP, FP, and FN are numbers of true positive, false positive, and false negative cells. Compared to the proposed algorithm in H. Qu, et al. "Weakly Supervised Deep Nuclei Segmentation using Points Annotation in Histopathology Images." *International Conference on Medical Imaging with Deep Learning (IMDL)*, 2019, the designed algorithm shows significant improvement in cell segmentation and detection, without increasing the annotation efforts. The conditional random field (CRF) post-processing step is excluded, which was used in H. Qu, et al. "Weakly Supervised Deep Nuclei Segmentation using Points Annotation in Histopathology Images." *International Conference on Medical Imaging with Deep Learning (IMDL)*, 2019, in the comparison.

The multi-task scheduler method performance was separately compared with the multi-task learning method using uncertainty proposed in A. Kendall, Y. Gal, and R. Cipolla. "Multi-task learning using uncertainty to weigh losses for scene geometry and semantics." *Proceedings of the IEEE Conference on Computer Vision and Pattern Recognition.* 2018 [2], which is incorporated herein for all purposes. Based on the results, the multi-task scheduler method shows better performance compared to the task uncertainty method, where an additional loss layer with learnable weights was defined to combine the three losses. The results of segmentation and detection are summarized in Table 1 and 2 below.

TABLE 1

Segmentation performance of the proposed algorithm in comparison with the conventional algorithms.

| Method | ACC | F1 | Dice | AJI |
|---|---|---|---|---|
| Method in [1], without CRF | 0.887 | 0.681 | 0.664 | 0.460 |
| Designed algorithm with task uncertainty | 0.915 | 0.731 | 0.735 | 0.532 |

TABLE 1-continued

Segmentation performance of the proposed algorithm in comparison with the conventional algorithms.

| Method | ACC | F1 | Dice | AJI |
|---|---|---|---|---|
| [2] Designed algorithm with multi-task scheduler | 0.929 | 0.791 | 0.784 | 0.599 |

TABLE 2

Detection performance of the designed algorithm in comparison with the conventional algorithms.

| Method | Precision | Recall | CCC |
|---|---|---|---|
| Method in [1], without CRF | 0.874 | 0.936 | 0.015 |
| Designed algorithm with task uncertainty [2] | 0.964 | 0.907 | 0.997 |
| Designed algorithm with multi-task scheduler | 0.941 | 0.925 | 0.998 |

Figure 5:
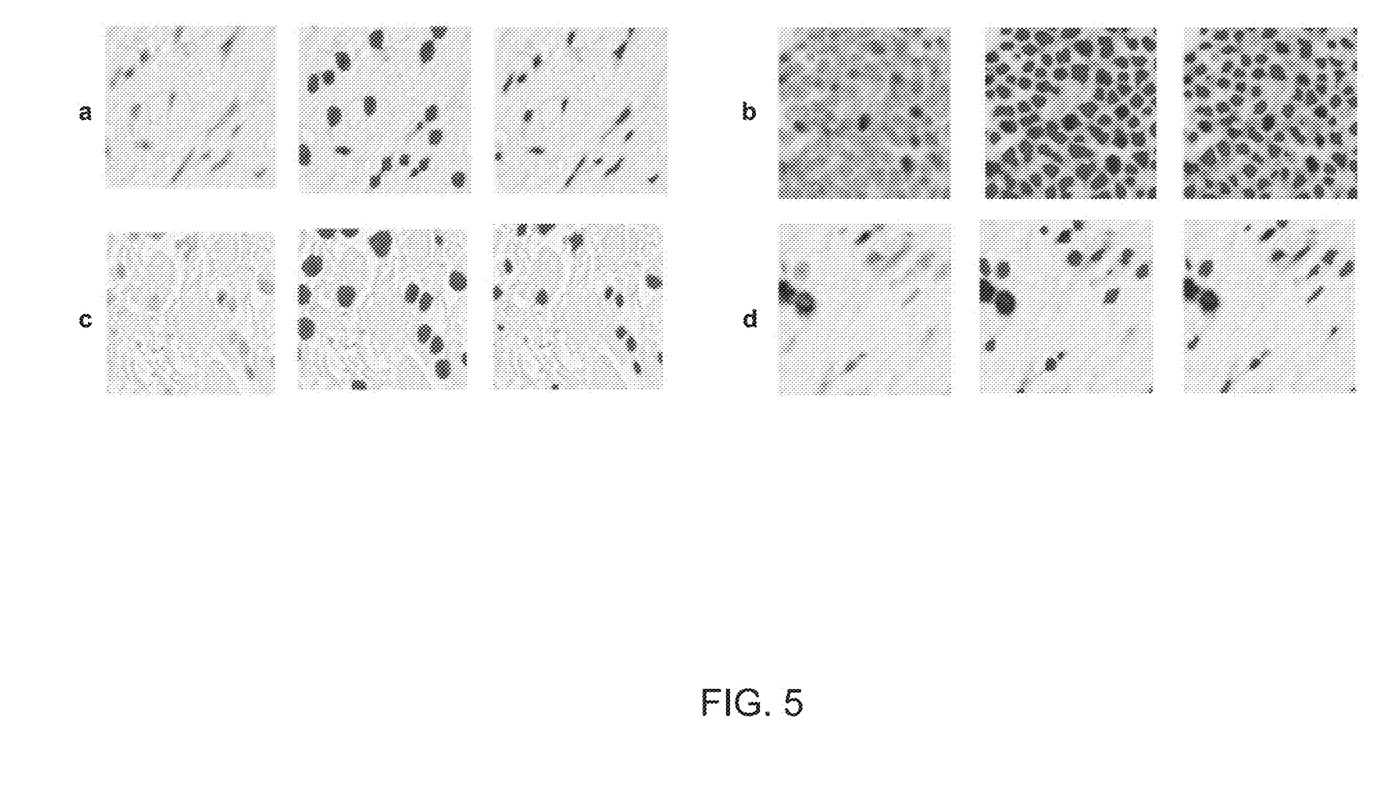
FIG. 5 shows segmentation performance with sample test images (left image), the overlaid segmentation masks based on the algorithm proposed in [1] without CRF (middle image), and the present algorithm (right image): (a) normal tissue region with elongated cells, (b) intra-follicular region with highly clustered cells, (c) normal tissue region with unstained cells, and (d) tumor region with weakly and strongly stained in accordance with various embodiments.

FIG. 5 illustrates instance segmentation performance of the designed algorithm, in comparison with the proposed algorithm in H. Qu, et al. "Weakly Supervised Deep Nuclei Segmentation using Points Annotation in Histopathology Images." *International Conference on Medical Imaging with Deep Learning* (*IMDL*), 2019, including some sample test images and the segmentation mask overlaid on top on the original images. Specifically, FIG. 5 shows: (a) control region with elongated cells, (b) control region with negative tumor cells, (c) tissue region with highly clustered cells, and (d) tumor region with weakly and well stained cells. The algorithm performed well in segmentation of these various types of cells.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:

1. A method comprising:
accessing, by a data processing system, a plurality of images of one or more cells;
extracting, by the data processing system, three labels from the plurality of images, wherein the three labels are extracted using a Voronoi transformation, a local clustering, and application of repel code;
training, by a multi-task scheduler of the data processing system, a convolutional neural network model based on three loss functions corresponding to the three labels, wherein the convolutional network model comprises a plurality of model parameters;
generating, by the convolutional neural network model, a nuclei probability map and a background probability map for each of the plurality of images based on the training with the three loss functions;
comparing, by the data processing system, the nuclei probability map and the background probability map to the three labels;
updating, by the data processing system, the plurality of model parameters based on the comparing the nuclei probability map and the background probability map to the three labels to minimize the three loss functions; and
providing, by the data processing system, a trained convolutional neural network model with the updated plurality of model parameters.

2. The method of claim 1, wherein the plurality of images comprise nuclei point labels.

3. The method of claim 2, wherein the Voronoi transformation extracts ridge lines between the one or more cells.

4. The method of claim 2, wherein the local clustering includes applying a k-mean clustering algorithm to locally extract background and nuclei clusters based on RGB channels color features which are concatenated with a distance transform feature, which is a distance of each pixel in each cell or polygon created by the Voronoi transformation to the nuclei point label.

5. The method of claim 4, wherein the convolutional neural network model comprises a modified U-Net model.

6. The method of claim 5, wherein the training comprises:

for each training iteration, select, by the multi-task scheduler, one of the three loss functions; and update, by the data processing system, one or more weights of the convolutional neural network model based on a gradient of the selected loss function.

7. The method of claim 6, wherein the loss function is selected by the multi-task scheduler based on the following: select the loss function associated with the Voronoi label if "i % 3=0", the loss function associated with the repel label if "i % 3=1", and the loss function associated with the local cluster label if "i % 3=2", where "i" is the index of the training iteration.

8. The method of claim 7, wherein the generating the nuclei probability map and the background probability map comprise applying argmax and local maxima functions on the nuclei probability map and the background probability map, segmentation binary masks and coordinates of detected cells.

9. A non-transitory machine-readable storage medium, including instructions configured to cause one or more data processors to perform actions including:

accessing, by a data processing system, a plurality of images of one or more cells;

extracting, by the data processing system, three labels from the plurality of images, wherein the three labels are extracted using a Voronoi transformation, a local clustering, and application of repel code;

training, by a multi-task scheduler of the data processing system, a convolutional neural network model based on three loss functions corresponding to the three labels, wherein the convolutional network model comprises a plurality of model parameters;

generating, by the convolutional neural network model, a nuclei probability map and a background probability map for each of the plurality of images based on the training with the three loss functions;

comparing, by the data processing system, the nuclei probability map and the background probability map to the three labels;

updating, by the data processing system, the plurality of model parameters based on the comparing the nuclei probability map and the background probability map to the three labels to minimize the three loss functions; and providing, by the data processing system, a trained convolutional neural network model with the updated plurality of model parameters.

10. The non-transitory machine-readable storage medium of claim 9, wherein the plurality of images comprise nuclei point labels.

11. The non-transitory machine-readable storage medium of claim 10, wherein the Voronoi transformation extracts ridge lines between the one or more cells.

12. The non-transitory machine-readable storage medium of claim 10, wherein the local clustering includes applying a k-mean clustering algorithm to locally extract background and nuclei clusters based on RGB channels color features which are concatenated with a distance transform feature, which is a distance of each pixel in each cell or polygon created by the Voronoi transformation to the nuclei point label.

13. The non-transitory machine-readable storage medium of claim 12, wherein the training comprises:

for each training iteration, select, by the multi-task scheduler, one of the three loss functions; and update, by the data processing system, one or more weights of the convolutional neural network model based on a gradient of the selected loss function; and the loss function is selected by the multi-task scheduler based on the following: select the loss function associated with the Voronoi label if "i % 3=0", the loss function associated with the repel label if "i % 3=1", and the loss function associated with the local cluster label if "i % 3=2", where "i" is the index of the training iteration.

14. The non-transitory machine-readable storage medium of claim 13, wherein the generating the nuclei probability map and the background probability map comprise applying argmax and local maxima functions on the nuclei probability map and the background probability map, segmentation binary masks and coordinates of detected cells.

15. A system comprising:

one or more data processors; and a non-transitory computer readable storage medium containing instructions which, when executed on the one or more data processors, cause the one or more data processors to perform actions including:

accessing, by a data processing system, a plurality of images of one or more cells;

extracting, by the data processing system, three labels from the plurality of images, wherein the three labels are extracted using a Voronoi transformation, a local clustering, and application of repel code;

training, by a multi-task scheduler of the data processing system, a convolutional neural network model based on three loss functions corresponding to the three labels, wherein the convolutional network model comprises a plurality of model parameters;

generating, by the convolutional neural network model, a nuclei probability map and a background probability map for each of the plurality of images based on the training with the three loss functions;

comparing, by the data processing system, the nuclei probability map and the background probability map to the three labels;

updating, by the data processing system, the plurality of model parameters based on the comparing the nuclei probability map and the background probability map to the three labels to minimize the three loss functions; and providing, by the data processing system, a trained convolutional neural network model with the updated plurality of model parameters.

16. The system of claim 15, wherein the plurality of images comprise nuclei point labels.

17. The system of claim 16, wherein the Voronoi transformation extracts ridge lines between the one or more cells.

18. The system of claim 17, wherein the local clustering includes applying a k-mean clustering algorithm to locally extract background and nuclei clusters based on RGB channels color features which are concatenated with a distance transform feature, which is a distance of each pixel in each cell or polygon created by the Voronoi transformation to the nuclei point label.

19. The system of claim 18, wherein the training comprises:

for each training iteration:

select, by the multi-task scheduler, one of the three loss functions; and update, by the data processing system, one or more weights of the convolutional neural network model based on a gradient of the selected loss function; and the loss function is selected by the multi-task scheduler based on the following: select the loss function associated with the Voronoi label if "i % 3=0", the loss function associated with the repel label if "i % 3=1", and the loss function associated with the local cluster label if "i % 3=2", where "i" is the index of the training iteration.

20. The system of claim 19, wherein the generating the nuclei probability map and the background probability map comprise applying argmax and local maxima functions on the nuclei probability map and the background probability map, segmentation binary masks and coordinates of detected cells.

\* \* \* \* \*